US012245312B2

(12) United States Patent
Wu

(10) Patent No.: US 12,245,312 B2
(45) Date of Patent: Mar. 4, 2025

(54) METHOD FOR REPORTING ASSISTANCE INFORMATION, METHOD FOR CONFIGURING REPORTING OF ASSISTANCE INFORMATION, TERMINAL, AND NETWORK SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 414 days.

(21) Appl. No.: 17/670,756

(22) Filed: Feb. 14, 2022

(65) Prior Publication Data

US 2022/0174560 A1 Jun. 2, 2022

Related U.S. Application Data

(63) Continuation of application No. PCT/CN2020/107397, filed on Aug. 6, 2020.

(30) Foreign Application Priority Data

Aug. 15, 2019 (CN) .......................... 201910755723.5

(51) Int. Cl.
  *H04W 36/00*  (2009.01)
  *H04W 36/08*  (2009.01)
  *H04W 36/18*  (2009.01)
  *H04W 36/32*  (2009.01)
  *H04W 76/25*  (2018.01)

(52) U.S. Cl.
  CPC ..... *H04W 76/25* (2018.02); *H04W 36/00725* (2023.05); *H04W 36/0069* (2018.08)

(58) Field of Classification Search
  CPC ............ H04W 36/0069; H04W 76/25; H04W 36/0072
  See application file for complete search history.

(56) References Cited

U.S. PATENT DOCUMENTS

| 9,681,340 B2 | 6/2017 | Sebire et al. |
| 2015/0172969 A1 | 6/2015 | Sebire et al. |
| 2016/0037579 A1 | 2/2016 | Jung et al. |

(Continued)

FOREIGN PATENT DOCUMENTS

| CN | 107690163 A | 2/2018 |
| CN | 109257777 A | 1/2019 |

(Continued)

OTHER PUBLICATIONS

IP.com (Year: 2024).*

(Continued)

*Primary Examiner* — Moustapha Diaby
(74) *Attorney, Agent, or Firm* — Price Heneveld LLP

(57) ABSTRACT

A method for reporting assistance information, a method for configuring reporting of assistance information, a terminal, and a network side device. The method for reporting assistance information is applicable to a terminal and includes: reporting assistance information of the terminal to a target cell in a dual connectivity mobility process, where in the dual connectivity mobility process, the terminal maintains connections to a source cell and the target cell simultaneously.

19 Claims, 4 Drawing Sheets

(56) References Cited

U.S. PATENT DOCUMENTS

| | | | | |
|---|---|---|---|---|
| 2016/0249405 | A1* | 8/2016 | Koc | H04W 72/0453 |
| 2018/0115928 | A1 | 4/2018 | Kim et al. | |
| 2018/0124648 | A1 | 5/2018 | Park et al. | |
| 2020/0275326 | A1 | 8/2020 | Ma et al. | |
| 2022/0124697 | A1* | 4/2022 | Yao | H04W 76/15 |

FOREIGN PATENT DOCUMENTS

| | | |
|---|---|---|
| CN | 109586943 A | 4/2019 |
| KR | 20150009594 A | 1/2015 |
| WO | 2014058373 A1 | 4/2014 |
| WO | 2015161575 A1 | 10/2015 |
| WO | 2018024212 A1 | 2/2018 |
| WO | 2019031808 A1 | 2/2019 |

OTHER PUBLICATIONS

ProQuest search (Year: 2024).*
Huawei, "CR on introduction of UE assistance information in inter-node message", 3GPP TSG-RAN2 Meeting#105, R2-1901684, Athens, Greece, Feb. 25-Mar. 1, 2019.
Vivo, "Consideration of the RRC support of DC HO", 3GPP TSG-RAN WG2 Meeting #104, R2-1816432, Spokane, USA, Nov. 12-16, 2018.
Oppo, "Temporary UE Capability Restriction for Overheating Issues", 3GPP TSG-RAN2 Meeting #103bis, R2-1814500, Chengdu, P. R. China, Aug. 8-12, 2018.
Vivo, "UP architecture and impacts of DC handover", 3GPP TSG-RAN WG2 Meeting #103bis, R2-1814193, Chengdu, China, Oct. 8-12, 2018.
Huawei, "Discussion on UE temporary access capability restriction", 3GPP TSG-RAN WG2#AH1807, R2-1810317, Montreal, Canada, Jul. 2-6, 2018.
Vivo, "Consideration on the SRB of the DC handover", 3GPP TSG-RAN WG2 Meeting #105, R2-1900509, Athens, Greece, Feb. 25-Mar. 1, 2019.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.6.0 (Jun. 2019), Valbonne, France.
Vivo, "Discussion on the IDC report of NR frequency in EN-DC", 3GPP TSG-RAN WG2 Meeting #102, R2-1807634, Busan, Korea, May 21-25, 2018.
NEC Corporation, "UE assistance information in dual connectivity", 3GPP TSG RAN2 Meeting #87bis, R2-144497, Shanghai, China, Oct. 6-10, 2014.
Nokia, Nokia Shanghai Bell, "Backhaul link RLF handling", 3GPP TSG-RAN WG2 Meeting #105, R2-1900627, Athens, Greece, Feb. 25-Mar. 1, 2019.

* cited by examiner

METHOD FOR REPORTING ASSISTANCE INFORMATION, METHOD FOR CONFIGURING REPORTING OF ASSISTANCE INFORMATION, TERMINAL, AND NETWORK SIDE DEVICE

CROSS-REFERENCE TO RELATED APPLICATIONS

This application is a continuation application of International Application No. PCT/CN2020/107397 filed on Aug. 6, 2020, which claims priority to Chinese Patent Application No. 201910755723.5 filed on Aug. 15, 2019, which are incorporated herein by reference in their entireties.

TECHNICAL FIELD

The present disclosure relates to the field of communication technologies, and in particular, to a method for reporting assistance information, a method for configuring reporting of assistance information, a terminal, and a network side device.

BACKGROUND

A terminal supporting dual connectivity (DC) can simultaneously establish connections to two cells or two cell groups. In a dual connectivity mobility process, the terminal may maintain connections to a source cell and a target cell simultaneously. Then the terminal may release the connection to the source cell, but only maintain the connection to the target cell. Currently, there is yet no definite solution for how a terminal reports assistance information in a dual connectivity application scenario.

SUMMARY

Embodiments of the present disclosure provides a method for reporting assistance information, a method for configuring reporting of assistance information, a terminal, and a network side device.

According to a first aspect, an embodiment of the present disclosure provides a method for reporting assistance information, applicable to a terminal, the method including: reporting assistance information of the terminal to a target cell in a dual connectivity mobility process, wherein the dual connectivity mobility process, the terminal maintains connections to a source cell and the target cell simultaneously.

According to a second aspect, an embodiment of the present disclosure provides a method for configuring reporting of assistance information, applicable to a network side device, the method including: sending control information to a terminal, where the control information is used for configuring the terminal to report assistance information to a target cell in a dual connectivity mobility process, and in the dual connectivity mobility process, the terminal maintains connections to a source cell and the target cell simultaneously.

According to a third aspect, an embodiment of the present disclosure provides a terminal, including: a sending module, configured to report assistance information of the terminal to a target cell in a dual connectivity mobility process, where in the dual connectivity mobility process, the terminal maintains connections to a source cell and the target cell simultaneously.

According to a fourth aspect, an embodiment of the present disclosure provides a network side device, including: a sending module, configured to send control information to a terminal, where the control information is used for configuring the terminal to report assistance information to a target cell in a dual connectivity mobility process; in the dual connectivity mobility process, the terminal maintains connections to a source cell and the target cell simultaneously; and the network side device includes at least one of a network side device of the source cell and a network side device of the target cell.

According to a fifth aspect, an embodiment of the present disclosure provides a terminal, including a memory, a processor, and a computer program stored in the memory and executable on the processor, the computer program, when executed by the processor, implementing steps of the method for reporting assistance information provided in the first aspect of the embodiments of the present disclosure.

According to a sixth aspect, an embodiment of the present disclosure provides a network side device, including a memory, a processor, and a computer program stored in the memory and executable on the processor, the computer program, when executed by the processor, implementing steps of the method for configuring reporting of assistance information provided in the second aspect of the embodiments of the present disclosure.

According to a seventh aspect, an embodiment of the present disclosure provides a computer-readable storage medium, storing a computer program, the computer program, when executed by a processor, implementing steps of the method for reporting assistance information provided in the first aspect of the embodiments of the present disclosure.

According to an eighth aspect, an embodiment of the present disclosure provides a computer-readable storage medium, storing a computer program, the computer program, when executed by a processor, implementing steps of the method for configuring reporting of assistance information provided in the second aspect of the embodiments of the present disclosure.

BRIEF DESCRIPTION OF THE DRAWINGS

To describe the technical solutions in embodiments of the present disclosure more clearly, the following briefly describes accompanying drawings required for describing the embodiments of the present disclosure. Apparently, the accompanying drawings in the following description show merely some embodiments of the present disclosure, and a person of ordinary skill in the art can still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

The terms "include" and any other variants in the specification and the claims of this application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the specification and the claims represents at least one of the connected objects. For example, A and/or B represents the following three cases: Only A exists, only B exists, and both A and B exist.

In the embodiments of the present disclosure, words such as "exemplarily" or "for example" represent being used as examples, illustrations, or illustrations. Any embodiment or design solution described as "exemplarily" or "for example" in the embodiments of the present disclosure shall not be construed as being more preferable or advantageous than other embodiments or design solutions. To be precise, words such as "exemplarily" or "for example" are used to present related concepts in a specific manner.

A dual connectivity application scenario of a terminal is briefly described before the technical solutions of the embodiments of the present disclosure are described in detail.

In the dual connectivity application scenario, the terminal may simultaneously establish connections to two cell groups. That is, the terminal may simultaneously establish connections to a master cell group (MCG) and a secondary cell group (SCG). The MCG includes a primary cell (PCell) and a secondary cell (SCell), and the SCG includes a primary secondary cell (PSCell) and a SCell. The PCell and the PSCell may alternatively be referred to as a special cell (SpCell).

Figure 1:
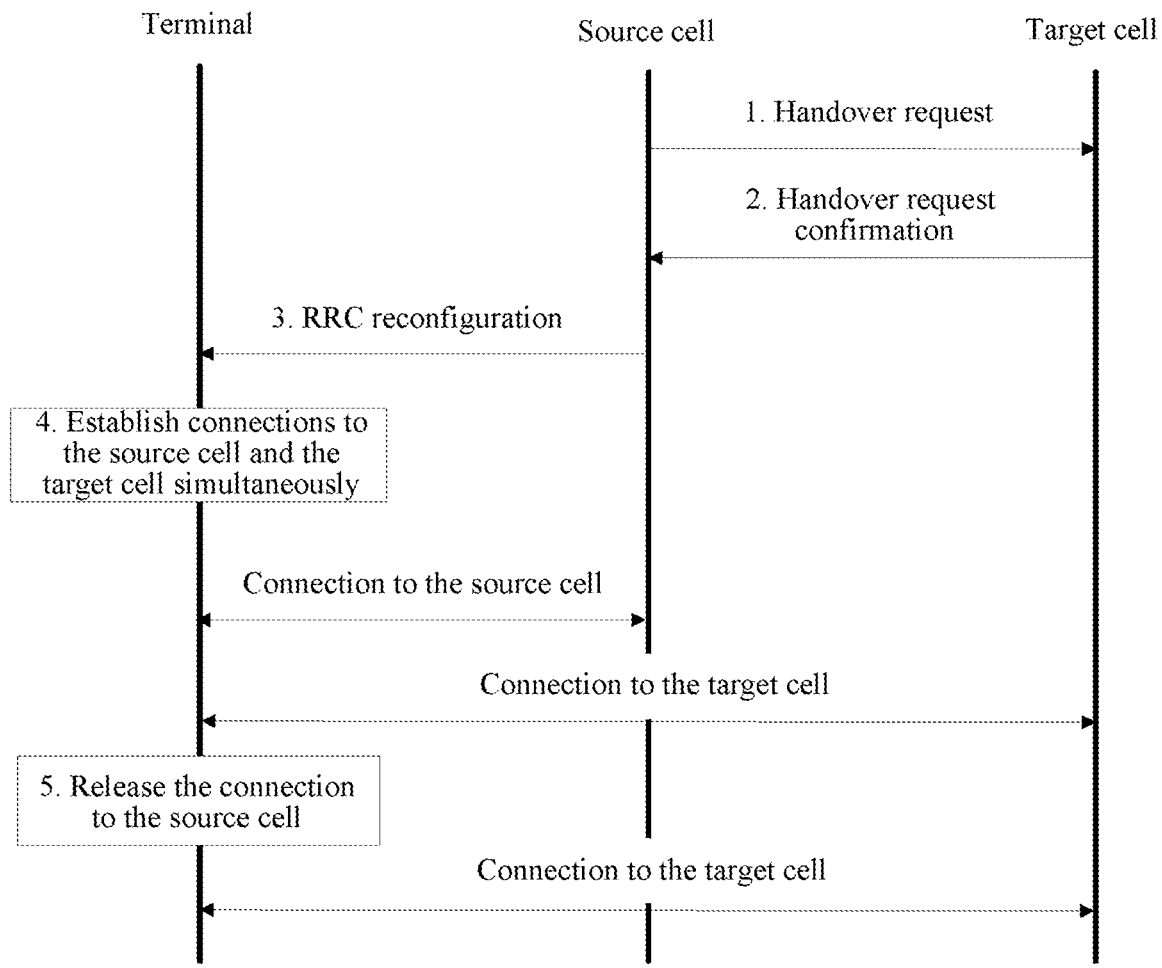
FIG. 1 is a schematic diagram of a dual connectivity mobility process.

In the dual connectivity application scenario, a dual connectivity mobility process, for example, a dual connectivity handover or a SCG change, exists. As shown in FIG. 1, in a dual connectivity mobility process, the terminal maintains connections to a source cell and a target cell simultaneously (step 4 in FIG. 1), and then the terminal releases the connection to the source cell, and only maintains the connection to the target cell (step 5 in FIG. 1).

In the dual connectivity mobility process, the terminal may need to report assistance information to a network side. Usually, the terminal reports the assistance information only when there is assistance information to be reported for the first time or when contents of the previously reported assistance information changes. Currently, there is yet no definite solution for how a terminal reports assistance information in a dual connectivity application scenario. Further, there is yet no definite solution for how a terminal reports assistance information in a dual connectivity mobility process. This results in that contents of the assistance information cannot be kept consistent between the network side device and the terminal, which affects the communication performance in the dual connectivity application scenario.

Further, if the network side device configures the terminal to be allowed to report assistance information to a source cell and a target cell, and in a dual connectivity mobility process, if the terminal reports assistance information in the source cell, and contents of the assistance information does not change, the terminal will not report the contents of the assistance information again. When the terminal releases the connection to the source cell and only maintains the connection to the target cell, the target cell cannot obtain the assistance information of the terminal, which further affects the communication performance in the dual connectivity application scenario.

In view of this, to resolve the problem described above, the embodiments of the present disclosure provide a method for reporting assistance information, a method for configuring reporting of assistance information, a terminal, and a network side device.

The following describes the embodiments of the present disclosure with reference to the accompanying drawings. The embodiments provided in the present disclosure may be applied to a wireless communication system. The wireless communication system may be a 5G system, an evolved long term evolution (eLTE) system, or a subsequent evolution communication system.

Figure 2:
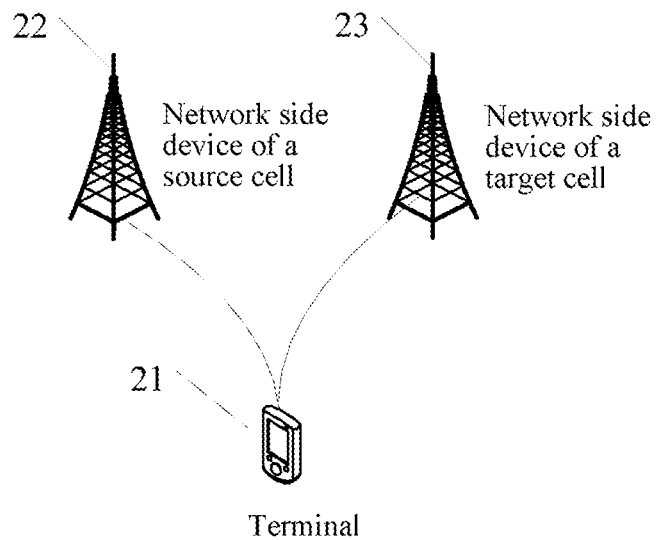
FIG. 2 is a structural diagram of a network system according to an embodiment of the present disclosure.

FIG. 2 is a structural diagram of a network system according to an embodiment of the present disclosure. FIG. 2 includes a terminal 21, a network side device 22 of a source cell, and a network side device 23 of a target cell. The terminal 21 may be a mobile communication device, for example, a mobile phone, a tablet personal computer, a laptop computer, a personal digital assistant (PDA), a mobile Internet device (MID), or a wearable device. It should be noted that a specific type of the terminal 21 is not limited in the embodiments of the present disclosure. The network side device 22 of the source cell and the network side device 23 of the target cell may be 5G network side devices (such as gNBs and 5GNRNBs), 4G network side devices (for example, eNBs), 3G network side devices (for example, NBs), network side devices in a subsequent evolution communication system, or the like. It should be noted that a specific type of the network side device 22 of the source cell and the network side device 23 of the target cell is not limited in the embodiments of the present disclosure.

Figure 3:
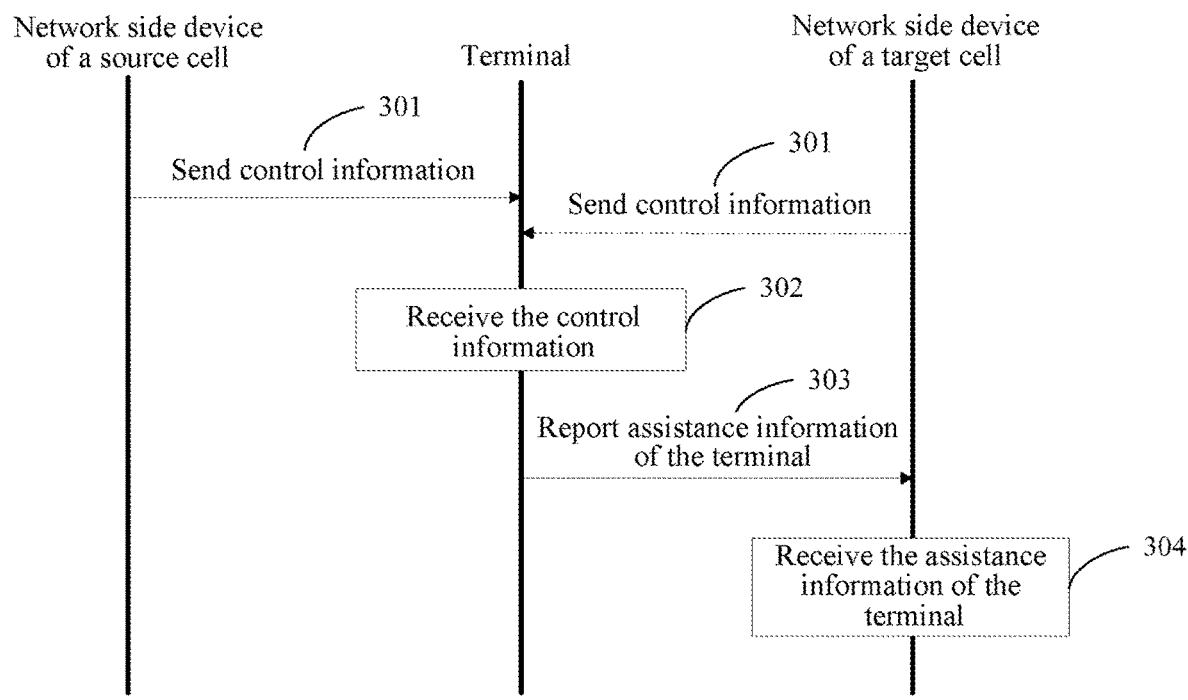
FIG. 3 is a flowchart of a method for reporting assistance information applicable to a network system according to an embodiment of the present disclosure.

FIG. 3 is a flowchart of a method for reporting assistance information according to an embodiment of the present disclosure, where the method is applicable to the network system shown in FIG. 2. As shown in FIG. 3, the method includes the following steps:

Step 301: A network side device of a source cell or a network side device of a target cell sends control information to a terminal.

The network side device configures, by using the control information, the terminal to report assistance information to the target cell in a dual connectivity mobility process. In the dual connectivity mobility process, the terminal maintains connections to the source cell and the target cell simultaneously. The network side device includes at least one of a network side device of the source cell or a network side device of the target cell.

Step 302: The terminal receives the control information sent by the network side device.

Step 303: The terminal reports assistance information of the terminal to the target cell in a dual connectivity mobility process.

Step 304: The network side device of the target cell receives the assistance information of the terminal.

Herein, that the terminal reports assistance information of the terminal to the target cell may be understood as that: the terminal reports the assistance information of the terminal to the network side device of the target cell. Correspondingly, if the terminal reports the assistance information of the terminal to the source cell, it may be understood as that: the terminal reports the assistance information of the terminal to the network side device of the source cell.

In the embodiments of the present disclosure, a network side device sends control information to a terminal, where the control information is used for configuring the terminal to report assistance information to a target cell in a dual connectivity mobility process. In this way, the terminal can report assistance information to the target cell in the dual connectivity mobility process, which ensures the advantage that the target cell obtains the assistance information in the dual connectivity mobility process, thereby avoiding a case in which reporting of assistance information to a source cell by the terminal causes the target cell to be incapable of obtaining the assistance information in the dual connectivity mobility process. This method helps to keep contents of the assistance information consistent between the network side device and the terminal, and helps to improve the communication performance in the dual connectivity application scenario.

Figure 4:
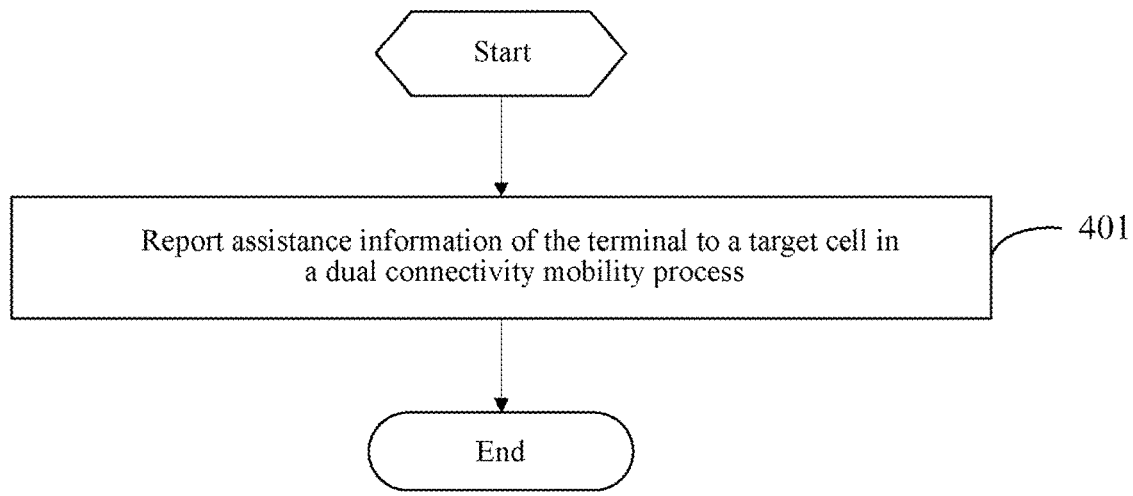
FIG. 4 is a flowchart of a method for reporting assistance information applicable to a terminal according to an embodiment of the present disclosure.

FIG. 4 is a flowchart of a method for reporting assistance information according to an embodiment of the present disclosure. As shown in FIG. 4, the method for reporting assistance information is applied to a terminal, and the method includes the following steps:

Step 401: Report assistance information of the terminal to a target cell in a dual connectivity mobility process.

In the dual connectivity mobility process, the terminal maintains connections to a source cell and the target cell simultaneously. The dual connectivity mobility process includes a dual connectivity handover or a SCG change. After the dual connectivity mobility process, the terminal may release the connection to the source cell, and only maintains the connection to the target cell. Herein, the source cell may be a cell group including a plurality of cells, that is, a source cell group; and the target cell may also be a cell group including a plurality of cells, that is, a target cell group.

An ending condition of the dual connectivity mobility process may include any one of the following: the terminal releases the connection to the source cell; a process of the terminal accessing to the target cell is successful, for example, a random access process of the terminal for a target PCell is successful, or for a mobility process using non-random access (for example, a RACHless handover), the terminal sends uplink information and then receives a confirmation message of the network side device; the dual connectivity handover fails, for example, T304 timeout for a dual connectivity handover process; the SCG change fails, for example, T307 timeout for a dual connectivity SCG change process; or the dual connectivity fails, for example, a wireless link failure occurs to a source connection and a target connection simultaneously.

It should be noted that after the dual connectivity mobility process, the terminal only maintains the connection to the target cell, and the assistance information of the terminal may alternatively be reported to the target cell after the dual connectivity mobility process.

The assistance information of the terminal may include at least one of the following: multimedia broadcast/multicast service (MBMS) interest information, for example, a current PCell of the terminal broadcasts SIB15, then the terminal is allowed to report an MBMS interest indication message, where the SIB15 is terminal positioning information; self-interference assistance information of the terminal, for example, anInDeviceCoexIndication (a device Coex indication) message; energy-saving preference information of the terminal, for example, an energy-saving preference information indication carried in a UEAssistanceInformation message; assistance information provided by a sidelink terminal, for example, a SidelinkUEInformation message; tolerance margin information of the terminal for data transmission and reception delays, for example, delayBudgetReport information carried in a UEAssistanceInformation message; or overheat indication assistance information of the terminal, for example, overheat indication assistance information carried in a UEAssistanceInformation message.

After the terminal reports some of the foregoing assistance information, for example, the overheat indication assistance information, the terminal starts an inhibition timer corresponding to the assistance information, and during running of the inhibition timer, the terminal cannot report the assistance information again.

In this step, the terminal may report the assistance information of the terminal to the target cell by using a signaling radio bearer 1 (SRB1) of the target cell. The SRB1 is used for sending a radio resource control (RRC) message of a dedicated control channel (DCCH) logic channel, for example, a connection reconfiguration message. The SRB1 may also be used for sending a non-access stratum (NAS) message before an SRB2 is established.

In this embodiment of the present disclosure, a terminal reports assistance information to a target cell in a dual connectivity mobility process, which ensures the advantage that the target cell obtains the assistance information in the dual connectivity mobility process, thereby avoiding a case in which reporting of assistance information to a source cell by the terminal causes the target cell to be incapable of obtaining the assistance information in the dual connectivity mobility process. This method helps to keep contents of the assistance information consistent between the network side device and the terminal, and helps to improve the communication performance in the dual connectivity application scenario.

Optionally, in the dual connectivity mobility process, the method further includes: prohibiting reporting assistance information of the terminal to the source cell; or reporting assistance information of the terminal to the source cell.

In this embodiment of the present disclosure, in addition to reporting the assistance information of the terminal to the target cell, the terminal may further be prohibited from reporting the assistance information of the terminal to the source cell, or may report the assistance information of the terminal to the source cell. In this way, there are three manners of reporting assistance information by the terminal as follows: first, the terminal reports the assistance information of the terminal to the target cell; second, the terminal reports the assistance information of the terminal to the target cell, and the terminal is prohibited from reporting the assistance information of the terminal to the source cell; third, the terminal reports the assistance information of the terminal to the target cell, and the terminal reports the assistance information of the terminal to the source cell.

A detailed description of various feasible manners of reporting assistance information or strategies for reporting assistance information is made below.

In an optional implementation, if a protocol agrees that the terminal is prohibited from reporting assistance information to the source cell in the dual connectivity mobility process, the terminal reports the assistance information of the terminal to the target cell, and is prohibited from reporting the assistance information of the terminal to the source cell.

In addition, the network side device may instruct the terminal to report assistance information in the source cell and the target cell. Specifically, the network side device may send control information, for example, dual connectivity mobility process control information, to the terminal, to instruct the terminal to be allowed to report assistance information in the source cell and the target cell, for example, instruct the terminal to be allowed to report assistance information in the source cell and the target cell simultaneously.

After receiving the dual connectivity mobility process control information sent by the network side device, the terminal may trigger a dual connectivity mobility process, for example, a dual connectivity handover, according to the dual connectivity mobility process control information.

In this implementation, although the terminal is configured to be allowed to report assistance information in the source cell and the target cell, the protocol agrees that in a dual connectivity mobility process, the terminal is prohibited from reporting assistance information to the source cell. For example, when the terminal triggers assistance information to the source cell, it is considered that an inhibition timer corresponding to the assistance information to the source cell is running, so that the terminal does not report the assistance information to the source cell.

In this implementation, the terminal complies with the protocol, and in the dual connectivity mobility process, the terminal is prohibited from reporting the assistance information of the terminal to the source cell, and only reports the assistance information of the terminal to the target cell.

Further, the method further includes: reporting the assistance information of the terminal to the source cell if the connection of the terminal to the target cell fails and the terminal maintains the connection to the source cell.

In this implementation, it can be agreed in a protocol that when the connection to the target cell fails, if the connection of the terminal to the source cell can still wok normally and the terminal has assistance information to report, the terminal is allowed to report the assistance information to the source cell. In this way, in a case that the connection to the target cell fails, contents of the assistance information can also be kept consistent between the network side device and the terminal, thereby helping to improve the communication performance in the dual connectivity application scenario.

In another optional implementation, if a network side device instructs the terminal to disable reporting of assistance information in the source cell, and to report assistance information in the target cell, the terminal reports the assistance information of the terminal to the target cell, and is prohibited from reporting the assistance information of the terminal to the source cell.

The network side device may send control information, for example, dual connectivity mobility process control information, to the terminal, to instruct the terminal to disable reporting of assistance information in the source cell, and to instruct the terminal report assistance information in the target cell. For example, the network side device may disable reporting of assistance information to the source cell or not configure reporting of assistance information to the source cell in otherConfig of source cell (or source cell group) configuration information in the dual connectivity mobility process control information.

After receiving the dual connectivity mobility process control information sent by the network side device, the terminal may trigger a dual connectivity mobility process, for example, a dual connectivity handover, according to the dual connectivity mobility process control information.

The network side device may be a network side device of the source cell and a network side device of the target cell. That is, the network side device may include at least one of the network side device of the source cell and the network side device of the target cell.

If the network side device is a network side device of the source cell, a dual connectivity mobility process preparation message sent by the network side device of the source cell (which may alternatively be referred to as a source node) to a network side device of the target cell (which may alternatively be referred to as a target node) instructs to disable reporting of assistance information to the source cell. For example, in a handover preparation message sent by the network side device of the source cell to the network side device of the target cell, the network side device of the source cell disables reporting of assistance information to the source cell in configuration information of the source cell.

If the network side device is a network side device of the target cell, a dual connectivity mobility process confirmation message sent by the network side device of the target cell to a network side device of the source cell instructs to disable reporting of assistance information to the source cell. For example, in a handover preparation confirmation message sent by the network side device of the target cell to the network side device of the source cell, the network side device of the target cell instructs to disable reporting of assistance information to the source cell.

In this implementation, according to the control information of the network side device, in the dual connectivity mobility process, the terminal does not report the assistance information of the terminal to the source cell, and only reports the assistance information of the terminal to the target cell.

Further, the method further includes: reporting the assistance information of the terminal to the source cell if the connection of the terminal to the target cell fails and the terminal maintains the connection to the source cell.

In this implementation, it can be agreed in a protocol that when the connection to the target cell fails, if the connection of the terminal to the source cell can still wok normally and the terminal has assistance information to report, the terminal is allowed to report the assistance information to the source cell. In this way, in a case that the connection to the target cell fails, contents of the assistance information can also be kept consistent between the network side device and the terminal, thereby helping to improve the communication performance in the dual connectivity application scenario.

In another optional implementation, before the reporting assistance information of the terminal to a target cell, the method further includes: deleting a first SRB of the source cell, where the first SRB is used for reporting the assistance information of the terminal; and establishing a second SRB of the target cell, where the second SRB is used for reporting the assistance information of the terminal.

The network side device may send control information, for example, dual connectivity mobility process control information, to the terminal. In the dual connectivity mobility process control information, the network side device may send corresponding RRC message sending channel configuration information to the terminal. The RRC message sending channel configuration information may include configuration information of an SRB1 and an SRB2 used in the target cell (or target cell group).

The RRC message sending channel configuration information may further include configuration information used for instructing to delete an SRB1 and an SRB2 of the source cell (or source cell group). Further, if the source cell (or source cell group) includes an SRB3 previously, the RRC message sending channel configuration information may further include configuration information used for instructing to delete the SRB3 of the source cell (or source cell group). Further, for a case that a plurality of accessed target cells each include an MCG and an SCG, the RRC message sending channel configuration information may further include configuration information used for instructing to configure an SRB3 to the SCG.

The SRB1 is used for sending an RRC message of a DCCH logic channel, for example, a connection reconfiguration message. The SRB1 may alternatively be used for sending a NAS message before the SRB2 is established. The terminal may report the assistance information of the terminal to the network side device by using the SRB1. The SRB2 is used for sending a NAS message by using a DCCH logic channel. The SRB2 has a lower priority than the SRB1 and may be configured after the security of an access network is activated. The terminal may report the assistance information of the terminal to the network side device by using the SRB2. The SRB3 is used for sending an RRC message of the SCG by using a DCCH logic channel.

The first SRB of the source cell may be understood as at least one of the SRB1, the SRB2, or the SRB3 of the source cell, and the second SRB of the target cell may be understood as at least one of the SRB1, the SRB2, or the SRB3 of the target cell.

In this implementation, the RRC message sending channel configuration information sent by the network side device includes configuration information of the SRB1 and the SRB2 used in the target cell, and further includes configuration information used for instructing to delete the SRB1 and the SRB2 of the source cell. The terminal may trigger a dual connectivity mobility process according to configuration information of the network side device. For the source cell (or source cell group), the terminal deletes the SRB1 and the SRB2 of the source cell (or the source cell group). For the target cell (or target cell group), the terminal establishes an SRB1 and an SRB2. If the source cell (or source cell group) includes an SRB3 previously, the terminal may alternatively delete the SRB3 of the source cell (or source cell group). In addition, for a case that a plurality of accessed target cells each include an MCG and an SCG, if the network side device configures an SRB3 to the SCG, the terminal may establish an SRB3 for the SCG.

For the SRB1, the SRB2, or the SRB3 of the target cell (or target cell group), the terminal may send and receive corresponding RRC messages in the target cell (or target cell group) according to respective functions of the SRB1, the SRB2, or the SRB3, for example, send the assistance information of the terminal. For the source cell (or source cell group), because the source cell includes no SRB1, SRB2, or SRB3, the terminal cannot report the assistance information of the terminal to the source cell (or source cell group).

It should be noted that related configuration of the RRC message sending channel configuration information may also be agreed in a protocol.

In this implementation, the terminal deletes the first SRB of the source cell and establishes the second SRB of the target cell, so that the terminal cannot report the assistance information of the terminal to the source cell, and only reports the assistance information of the terminal to the target cell.

Further, before the reporting assistance information of the terminal to a target cell, the method further includes: establishing a third SRB of the source cell, where the third SRB is used for reporting information indicating that the connection of the terminal to the target cell fails and/or the third SRB is not used for reporting the assistance information of the terminal.

The network side device may send control information, for example, dual connectivity mobility process control information, to the terminal. In the dual connectivity mobility process control information, the network side device may send corresponding RRC message sending channel configuration information to the terminal. The RRC message sending channel configuration information may include SRBx (for example, SRB4) configuration information used in the source cell (or source cell group), where the "SRBx configuration information" includes a logic channel identifier (for example, a logic channel identifier 4) corresponding to the SRBx.

In addition, it may be agreed in a protocol that types of messages that the SRBx of the source cell (or source cell group) can send include information used for indicating that the connection of the terminal to the target cell fails (which is referred to as "target cell connection failure information" for short). For example, the connection of the terminal to the target cell fails, and the terminal reports the target cell connection failure information to the network side device by using the SRBx of the source cell.

In addition, it may further be agreed in a protocol that the types of messages that the SRBx of the source cell (or source cell group) can send do not include the assistance information of the terminal. In other words, the terminal cannot send the assistance information of the terminal to the source cell by using the SRBx of the source cell.

A third SRB of the source cell may be understood as the SRBx of the source cell. The target cell connection failure information may include at least one of the following: information indicating a handover failure of the target cell; information indicating a wireless link failure of the target cell; information indicating an RRC message configuration failure of the target cell; or information indicating an integrity verification failure of the target cell.

Further, if the connection of the terminal to the target cell fails, the method further includes: reporting the information indicating that the connection of the terminal to the target cell fails to the source cell by using the third SRB.

In another optional implementation, before the reporting assistance information of the terminal to a target cell, the method further includes: maintaining a fourth SRB of the source cell, where before the dual connectivity mobility process, the fourth SRB is used for reporting the assistance information of the terminal, and in the dual connectivity mobility process, the fourth SRB is used for reporting information indicating that the connection of the terminal to the target cell fails and/or the fourth SRB is not used for reporting the assistance information of the terminal; and establishing a fifth SRB of the target cell, where the fifth SRB is used for reporting the assistance information of the terminal.

The network side device may send control information, for example, dual connectivity mobility process control information, to the terminal. In the dual connectivity mobility process control information, the network side device may send corresponding RRC message sending channel configuration information to the terminal. The RRC message sending channel configuration information may include configuration information of an SRB1 and an SRB2 used in the target cell (or target cell group). Further, for a case that a plurality of accessed target cells each include an MCG and an SCG, the RRC message sending channel configuration information may further include configuration information used for instructing to configure an SRB3 to the SCG.

The RRC message sending channel configuration information may further include configuration information used for modifying the types of messages that the SRB1 of the source cell (or source cell group) can send. For example, before the dual connectivity mobility process, the types of messages that the SRB1 of the source cell (or source cell group) can send include the assistance information of the terminal, and in the dual connectivity mobility process, the types of messages that the SRB1 of the source cell (or source cell group) can send do not include the assistance information of the terminal. Further, the types of messages that the SRB1 of the source cell (or source cell group) can send may include information used for indicating that the connection of the terminal to the target cell fails (which is referred to as "target cell connection failure information" for short). For example, the connection of the terminal to the target cell fails, and the terminal reports the target cell connection failure information to the network side device by using the SRB1 of the source cell.

A fourth SRB of the source cell may be understood as the SRB1 of the source cell, and a fifth SRB of the target cell may be understood as at least one of the SRB1, the SRB2, or the SRB3 of the target cell.

In this implementation, the RRC message sending channel configuration information sent by the network side device includes configuration information of the SRB1 and the SRB2 used in the target cell, and further includes configuration information used for modifying the types of messages that the SRB1 of the source cell (or source cell group) can send. The terminal may trigger a dual connectivity mobility process according to configuration information of the network side device. For the source cell (or source cell group), the terminal maintains the SRB1 of the source cell (or the source cell group). For the target cell (or target cell group), the terminal establishes an SRB1 and an SRB2. In addition, for a case that a plurality of accessed target cells each include an MCG and an SCG, if the network side device configures an SRB3 to the SCG, the terminal may establish an SRB3 for the SCG.

For the SRB1, the SRB2, or the SRB3 of the target cell (or target cell group), the terminal may send and receive corresponding RRC messages in the target cell (or target cell group) according to respective functions of the SRB1, the SRB2, or the SRB3, for example, send the assistance information of the terminal. For the source cell (or source cell group), because the SRB1 of the source cell (or source cell group) cannot be used for reporting the assistance information of the terminal in the dual connectivity mobility process, the terminal cannot report the assistance information of the terminal to the source cell (or source cell group).

It should be noted that related configuration of the RRC message sending channel configuration information may also be agreed in a protocol.

In this implementation, Although the terminal maintains the fourth SRB of the source cell, because the fourth SRB of the source cell is not used for reporting the assistance information of the terminal in the dual connectivity mobility process, the terminal cannot report the assistance information of the terminal to the source cell. The terminal establishes the fifth SRB of the target cell, so that the terminal only reports the assistance information of the terminal to the target cell.

Further, if the connection of the terminal to the target cell fails, the method further includes: reporting the information indicating that the connection of the terminal to the target cell fails to the source cell by using the fourth SRB.

In another optional implementation, if a network side device instructs the terminal to report assistance information in the source cell and the target cell, the terminal reports the assistance information of the terminal to the target cell and the source cell.

The network side device may send control information, for example, dual connectivity mobility process control information, to the terminal, to instruct the terminal to be allowed to report assistance information in the source cell and the target cell, for example, instruct the terminal to be allowed to report assistance information in the source cell and the target cell simultaneously.

After receiving the dual connectivity mobility process control information sent by the network side device, the terminal may trigger a dual connectivity mobility process, for example, a dual connectivity handover, according to the dual connectivity mobility process control information.

In this implementation, Because the terminal is configured to be allowed to report assistance information in the source cell and the target cell, the terminal may report the assistance information of the terminal to the target cell, and may also report the assistance information of the terminal to the source cell.

The terminal may report the assistance information of the terminal to the target cell and the source cell in the following two manners: First manner: The assistance information of the terminal is duplicated to generate first assistance information and second assistance information, the first assistance information is sent to the source cell, and the second assistance information is sent to the target cell. Second manner: Third assistance information is generated according to configuration information of the source cell, the third assistance information is sent to the source cell, fourth assistance information is generated according to configuration information of the target cell, and the fourth assistance information is sent to the target cell.

In the first manner, for reporting of assistance information triggered by each triggering condition, the terminal generates two pieces of assistance information. That is, the terminal duplicates the assistance information to generate the first assistance information and the second assistance information, and performs reporting through the source cell and the target cell respectively. For example, contents of MBMS interest information of the terminal changes, and an RRC layer of the terminal triggers to report the MBMS interest information to the network side device, then the RRC layer of the terminal generates two MBMS interest messages, where one MBMS interest message is sent by the SRB1 connected to the source cell, and the other MBMS interest message is sent by the SRB1 connected to the target cell. In this manner, the first assistance information and the second assistance information may be same assistance information.

In the second manner, for each assistance information reporting triggering condition, the RRC layer of the terminal triggers reporting of RRC assistance information twice. During one triggering operation, the third assistance information is generated according to the configuration information of the source cell and reported to the source cell; and during the other triggering operation, the fourth assistance information is generated according to the configuration information of the target cell and reported to the target cell, where both the configuration information are configuration information used for triggering the terminal to report the assistance information, for example, SIB15. For example, contents of MBMS interest information of the terminal changes, and an RRC layer of the terminal triggers to report the MBMS interest information to the network side device, then the terminal triggers to generate an MBMS interest message according to SIB15 of the source cell and sends the MBMS interest message by using the SRB1 connected to the source cell, and the terminal triggers to generate another MBMS interest message according to SIB15 of the target cell and sends the MBMS interest message by using the SRB1 connected to the target cell. In this manner, the third assistance information and the fourth assistance information may be different assistance information.

In addition, for the second manner, a report time point of the third assistance information differs from a report time point of the fourth assistance information by a preset time. Specifically, there may be two cases as follows: First, after the terminal triggers to generate the third assistance information according to the configuration information of the source cell and reports the third assistance information to the source cell, and after the preset time, the terminal triggers to generate the fourth assistance information according to the configuration information of the target cell and reports the fourth assistance information to the target cell. Second, after the terminal triggers to generate the fourth assistance information according to the configuration information of the target cell and reports the fourth assistance information to the target cell, and after the preset time, the terminal triggers to generate the third assistance information according to the configuration information of the source cell and reports the third assistance information to the source cell.

For example, the terminal triggers reporting of assistance information in the source cell. After triggering or sending assistance information of the source cell, and after one second, the terminal triggers reporting of assistance information in the target cell.

The preset time may be configured by the network side device or agreed by a protocol.

Based on the foregoing implementations, a terminal reports assistance information to a target cell in a dual connectivity mobility process, which ensures the advantage that the target cell obtains the assistance information in the dual connectivity mobility process, thereby avoiding a case in which reporting of assistance information to a source cell by the terminal causes the target cell to be incapable of obtaining the assistance information in the dual connectivity mobility process. This method helps to keep contents of the assistance information consistent between the network side device and the terminal, and helps to improve the communication performance in the dual connectivity application scenario.

Figure 5:
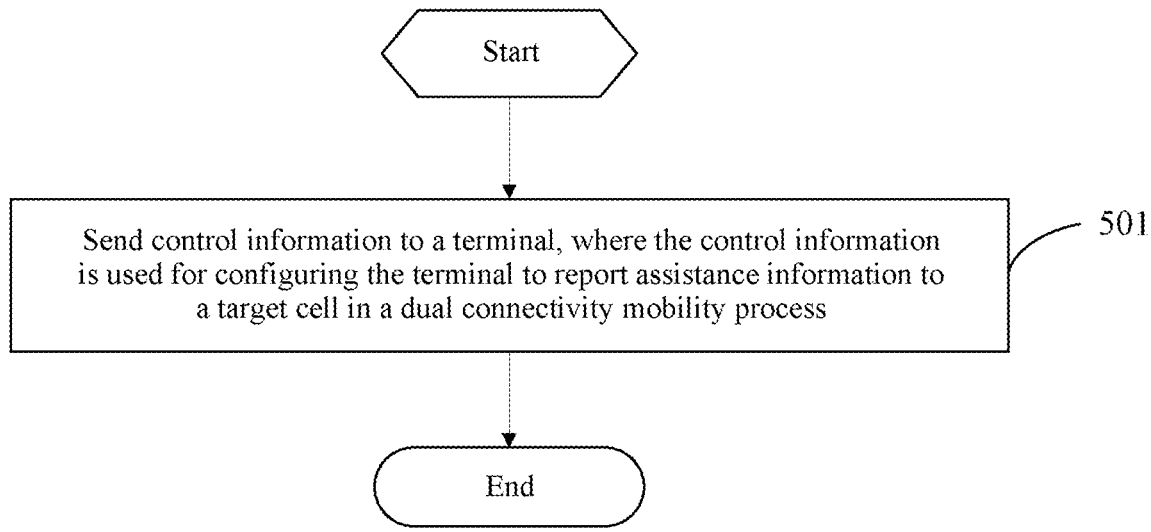
FIG. 5 is a flowchart of a method for configuring reporting of assistance information applicable to a network side device according to an embodiment of the present disclosure.

FIG. 5 is a flowchart of a method for configuring reporting of assistance information according to an embodiment of the present disclosure. As shown in FIG. 4, the method for configuring reporting of assistance information is applied to a network side device and the method includes the following steps:

Step 501: Send control information to a terminal, where the control information is used for configuring the terminal to report assistance information to a target cell in a dual connectivity mobility process.

In the dual connectivity mobility process, the terminal maintains connections to a source cell and the target cell simultaneously; and the network side device includes at least one of a network side device of the source cell or a network side device of the target cell.

Optionally, the control information is further used for: configuring the terminal to report assistance information to the source cell in the dual connectivity mobility process; or configuring to disable reporting of assistance information to the source cell by the terminal in the dual connectivity mobility process.

Optionally, before the sending control information to a terminal, the method further includes: sending, if the network side device is a network side device of the source cell, a dual connectivity mobility process preparation message to a network side device of the target cell, where the dual connectivity mobility process preparation message is used for instructing to disable reporting of assistance information to the source cell by the terminal; or sending, if the network side device is a network side device of the target cell, a dual connectivity mobility process confirmation message to a network side device of the source cell, where the dual connectivity mobility process confirmation message is used for instructing to disable reporting of assistance information to the source cell by the terminal.

Optionally, the control information includes RRC message sending channel configuration information, where the RRC message sending channel configuration information is used for indicating configuration information of a first SRB used in the target cell, where the first SRB is used for reporting the assistance information of the terminal.

Optionally, the RRC message sending channel configuration information is further used for indicating configuration information used for instructing to delete a second SRB of the source cell, where the second SRB is used for reporting the assistance information of the terminal.

Optionally, the RRC message sending channel configuration information is further used for indicating configuration information of a third SRB used in the source cell, where the third SRB is used for reporting information indicating that the connection of the terminal to the target cell fails and/or the third SRB is not used for reporting the assistance information of the terminal.

Optionally, the RRC message sending channel configuration information is further used for indicating a fourth SRB used in the source cell, where before the dual connectivity mobility process, the fourth SRB is used for reporting the assistance information of the terminal, and in the dual connectivity mobility process, the fourth SRB is used for reporting information indicating that the connection of the terminal to the target cell fails and/or the fourth SRB is not used for reporting the assistance information of the terminal.

In the embodiments of the present disclosure, a network side device sends control information to a terminal, where the control information is used for configuring the terminal to report assistance information to a target cell in a dual connectivity mobility process. In this way, the terminal can report assistance information to the target cell in the dual connectivity mobility process, which ensures the advantage that the target cell obtains the assistance information in the dual connectivity mobility process, thereby avoiding a case in which reporting of assistance information to a source cell by the terminal causes the target cell to be incapable of obtaining the assistance information in the dual connectivity mobility process. This method helps to keep contents of the assistance information consistent between the network side device and the terminal, and helps to improve the communication performance in the dual connectivity application scenario.

It should be noted that, this embodiment of the present disclosure is used as an embodiment of the network side device corresponding to the embodiment shown in FIG. 4, and for a specific implementation thereof, reference may be made to related descriptions of the embodiment shown in FIG. 4, and the same beneficial effects can be achieved, which will not be described in detail herein again to avoid repetition.

Figure 6:
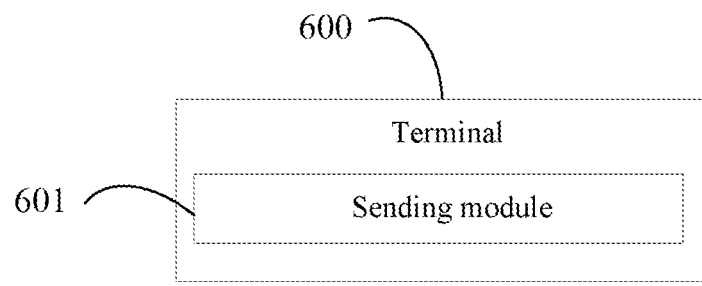
FIG. 6 is a schematic structural diagram of a terminal according to an embodiment of the present disclosure.

FIG. 6 is a structural diagram of a terminal according to an embodiment of the present disclosure. As shown in FIG. 6, a terminal 600 includes: a sending module 601, configured to report assistance information of the terminal to a target cell in a dual connectivity mobility process, where in the dual connectivity mobility process, the terminal maintains connections to a source cell and the target cell simultaneously.

Optionally, in the dual connectivity mobility process, the sending module 601 is further configured to: prohibit reporting assistance information of the terminal to the source cell; or report assistance information of the terminal to the source cell.

Optionally, if a protocol agrees that the terminal is prohibited from reporting assistance information to the source cell in the dual connectivity mobility process, the sending module 601 is configured to report the assistance information of the terminal to the target cell, and is prohibited from reporting the assistance information of the terminal to the source cell; or if a network side device instructs the terminal to disable reporting of assistance information in the source cell, and to report assistance information in the target cell, the sending module 601 is configured to report the assistance information of the terminal to the target cell, and is prohibited from reporting the assistance information of the terminal to the source cell.

Optionally, the sending module 601 is further configured to: report the assistance information of the terminal to the source cell if the connection of the terminal to the target cell fails and the terminal maintains the connection to the source cell.

Optionally, the network side device includes at least one of a network side device of the source cell or a network side device of the target cell.

Optionally, the terminal 600 further includes: a deletion module, configured to delete a first SRB of the source cell, where the first SRB is used for reporting the assistance information of the terminal; and a first establishment module, configured to establish a second SRB of the target cell, where the second SRB is used for reporting the assistance information of the terminal.

Optionally, the terminal 600 further includes: a second establishment module, configured to establish a third SRB of the source cell, where the third SRB is used for reporting information indicating that the connection of the terminal to the target cell fails and/or the third SRB is not used for reporting the assistance information of the terminal.

Optionally, if the connection of the terminal to the target cell fails, the sending module 601 is further configured to: report the information indicating that the connection of the terminal to the target cell fails to the source cell by using the third SRB.

Optionally, the terminal 600 further includes: a maintaining module, configured to maintain a fourth SRB of the source cell, where before the dual connectivity mobility process, the fourth SRB is used for reporting the assistance information of the terminal, and in the dual connectivity mobility process, the fourth SRB is used for reporting information indicating that the connection of the terminal to the target cell fails and/or the fourth SRB is not used for reporting the assistance information of the terminal; and a third establishment module, configured to establish a fifth SRB of the target cell, where the fifth SRB is used for reporting the assistance information of the terminal.

Optionally, if a network side device instructs the terminal to report assistance information in the source cell and the target cell, the sending module 601 is configured to report the assistance information of the terminal to the target cell and the source cell.

Optionally, the sending module 601 is specifically configured to: duplicate the assistance information of the terminal to generate first assistance information and second assistance information, and respectively send the first assistance information and the second assistance information to the source cell and the target cell; or generate third assistance information according to configuration information of the source cell and report the third assistance information to the source cell, and generate fourth assistance information according to configuration information of the target cell and report the fourth assistance information to the target cell.

Optionally, a report time point of the third assistance information differs from a report time point of the fourth assistance information by a preset time, where the preset time is configured by a network side or agreed by a protocol.

It should be noted that the terminal 600 in this embodiment of the present disclosure may be the terminal in any implementation of the method embodiments. Any implementation of the terminal in the method embodiments may be implemented by the terminal 600 in this embodiment of the present disclosure, and the same beneficial effects can be achieved, which will not be described in detail herein again to avoid repetition.

Figure 7:
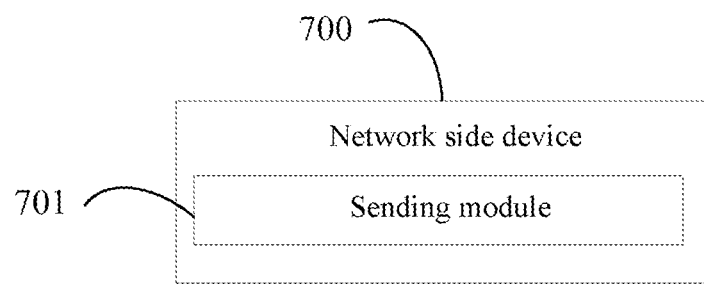
FIG. 7 is a schematic structural diagram of a network side device according to an embodiment of the present disclosure.

FIG. 7 is a structural diagram of a network side device according to an embodiment of the present disclosure. As shown in FIG. 7, the network side device 700 includes: a sending module 701, configured to send control information to a terminal, where the control information is used for configuring the terminal to report assistance information to a target cell in a dual connectivity mobility process; In the dual connectivity mobility process, the terminal maintains connections to a source cell and the target cell simultaneously; and the network side device includes at least one of a network side device of the source cell or a network side device of the target cell.

Optionally, the control information is further used for: configure the terminal to report assistance information to the source cell in the dual connectivity mobility process; or configuring to disable reporting of assistance information to the source cell by the terminal in the dual connectivity mobility process.

Optionally, if the network side device is a network side device of the source cell, the sending module 701 is further configured to: send a dual connectivity mobility process preparation message to a network side device of the target cell, where the dual connectivity mobility process preparation message is used for instructing to disable reporting of assistance information to the source cell by the terminal; or if the network side device is a network side device of the target cell, the sending module 701 is further configured to: send a dual connectivity mobility process confirmation message to a network side device of the source cell, where the dual connectivity mobility process confirmation message is used for instructing to disable reporting of assistance information to the source cell by the terminal.

Optionally, the control information includes RRC message sending channel configuration information, where the RRC message sending channel configuration information is used for indicating configuration information of a first SRB used in the target cell, where the first SRB is used for reporting the assistance information of the terminal.

Optionally, the RRC message sending channel configuration information is further used for indicating configuration information used for instructing to delete a second SRB of the source cell, where the second SRB is used for reporting the assistance information of the terminal.

Optionally, the RRC message sending channel configuration information is further used for indicating configuration information of a third SRB used in the source cell, where the third SRB is used for reporting information indicating that the connection of the terminal to the target cell fails and/or the third SRB is not used for reporting the assistance information of the terminal.

Optionally, the RRC message sending channel configuration information is further used for indicating a fourth SRB used in the source cell, where before the dual connectivity mobility process, the fourth SRB is used for reporting the assistance information of the terminal, and in the dual connectivity mobility process, the fourth SRB is used for reporting information indicating that the connection of the terminal to the target cell fails and/or the fourth SRB is not used for reporting the assistance information of the terminal.

It should be noted that the network side device 700 in this embodiment of the present disclosure may be the network side device in any implementation of the method embodiments. Any implementation of the network side device in the method embodiments may be implemented by the network side device 700 in this embodiment of the present disclosure, and the same beneficial effects can be achieved, which will not be described in detail herein again to avoid repetition.

Figure 8:
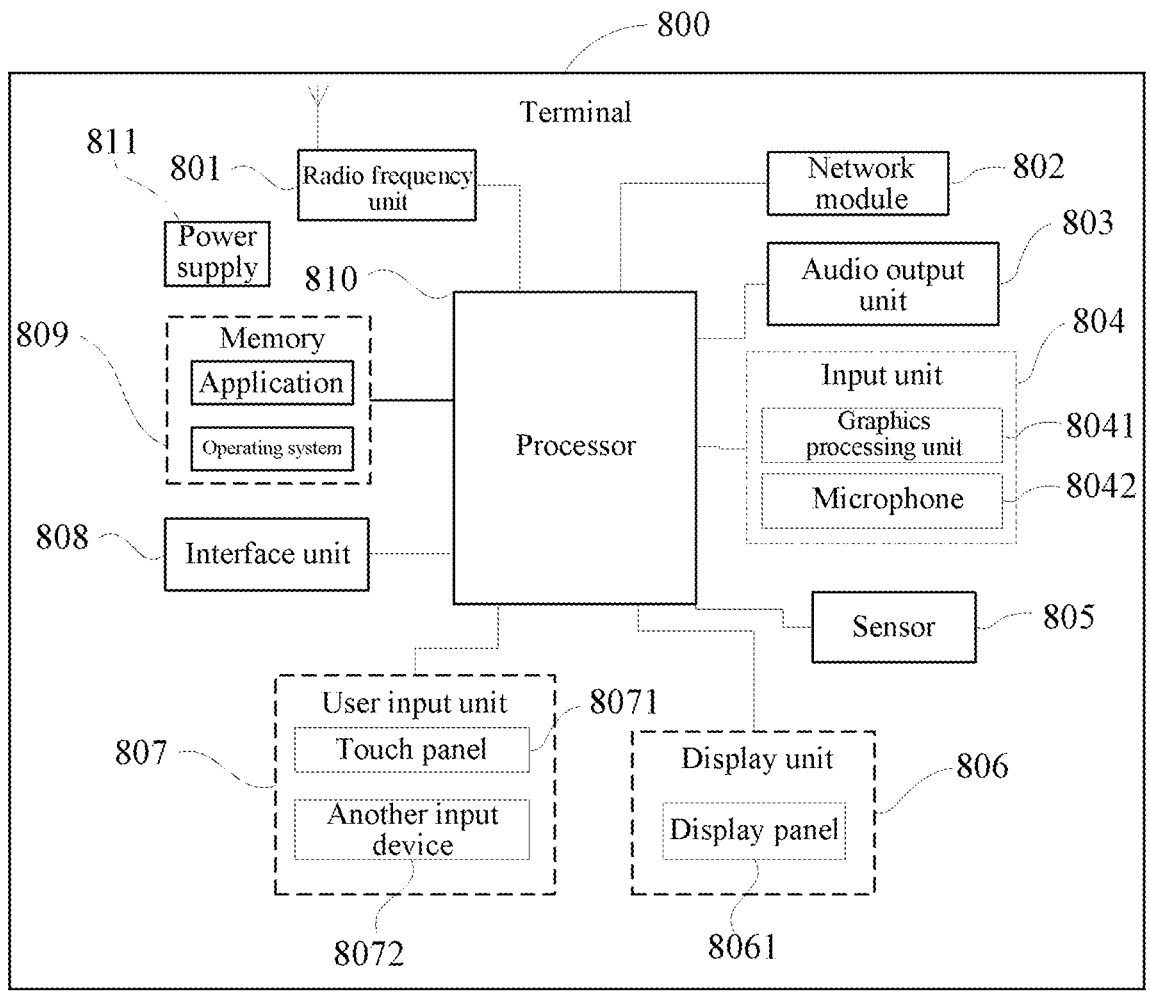
FIG. 8 is a schematic structural diagram of hardware of a terminal according to an embodiment of the present disclosure.

FIG. 8 is a schematic structural diagram of hardware of a terminal configured to implement the embodiments of the present disclosure. The terminal 800 includes, but is not limited to, components such as a radio frequency (RF) unit 801, a network module 802, an audio output unit 803, an input unit 804, a sensor 805, a display unit 806, a user input unit 807, an interface unit 808, a memory 809, a processor 810, and a power source 811. A person skilled in the art may understand that the terminal structure shown in FIG. 8 constitutes no limitation on the terminal, and the terminal may include more or fewer components than those shown in the figure, or some components may be combined, or a different component deployment may be used. The terminal in the embodiments of the present disclosure includes, but is not limited to, a mobile phone, a tablet computer, a notebook computer, a palmtop computer, a vehicle-mounted terminal, a wearable device, a pedometer, and the like.

The RF unit 801 is configured to: report assistance information of the terminal to a target cell in a dual connectivity mobility process, where in the dual connectivity mobility process, the terminal maintains connections to a source cell and the target cell simultaneously.

Optionally, in the dual connectivity mobility process, the RF unit 801 is further configured to: prohibit reporting assistance information of the terminal to the source cell; or report assistance information of the terminal to the source cell.

Optionally, if a protocol agrees that the terminal is prohibited from reporting assistance information to the source cell in the dual connectivity mobility process, the RF unit 801 is configured to report the assistance information of the terminal to the target cell, and is prohibited from reporting the assistance information of the terminal to the source cell; or if a network side device instructs the terminal to disable reporting of assistance information in the source cell, and to report assistance information in the target cell, the RF unit 801 is configured to report the assistance information of the terminal to the target cell, and is prohibited from reporting the assistance information of the terminal to the source cell.

Optionally, the RF unit 801 is further configured to: report the assistance information of the terminal to the source cell if the connection of the terminal to the target cell fails and the terminal maintains the connection to the source cell.

Optionally, the network side device includes at least one of a network side device of the source cell or a network side device of the target cell.

Optionally, the RF unit 801 or the processor 810 is configured to: delete a first SRB of the source cell, where the first SRB is used for reporting the assistance information of the terminal; and establish a second SRB of the target cell, where the second SRB is used for reporting the assistance information of the terminal.

Optionally, the RF unit 801 or the processor 810 is configured to: establish a third SRB of the source cell, where the third SRB is used for reporting information indicating that the connection of the terminal to the target cell fails and/or the third SRB is not used for reporting the assistance information of the terminal.

Optionally, if the connection of the terminal to the target cell fails, the RF unit 801 is further configured to: report the information indicating that the connection of the terminal to the target cell fails to the source cell by using the third SRB.

Optionally, the RF unit 801 or the processor 810 is configured to: maintain a fourth SRB of the source cell, where before the dual connectivity mobility process, the fourth SRB is used for reporting the assistance information of the terminal, and in the dual connectivity mobility process, the fourth SRB is used for reporting information indicating that the connection of the terminal to the target cell fails and/or the fourth SRB is not used for reporting the assistance information of the terminal; and establish a fifth SRB of the target cell, where the fifth SRB is used for reporting the assistance information of the terminal.

Optionally, if a network side device instructs the terminal to report assistance information in the source cell and the target cell, the RF unit 801 is configured to report the assistance information of the terminal to the target cell and the source cell.

Optionally, the RF unit 801 or the processor 810 is specifically configured to: duplicate the assistance information of the terminal to generate first assistance information and second assistance information; and the RF unit 801 is specifically configured to: respectively send the first assistance information and the second assistance information to the source cell and the target cell.

Optionally, the RF unit 801 or the processor 810 is specifically configured to: generate third assistance information according to configuration information of the source cell and report the third assistance information to the source cell, and generate fourth assistance information according to configuration information of the target cell and report the fourth assistance information to the target cell.

Optionally, a report time point of the third assistance information differs from a report time point of the fourth assistance information by a preset time, where the preset time is configured by a network side or agreed by a protocol.

In this embodiment of the present disclosure, a terminal reports assistance information to a target cell in a dual connectivity mobility process, which ensures the advantage that the target cell obtains the assistance information in the dual connectivity mobility process, thereby avoiding a case in which reporting of assistance information to a source cell by the terminal causes the target cell to be incapable of obtaining the assistance information in the dual connectivity mobility process. This method helps to keep contents of the assistance information consistent between the network side device and the terminal, and helps to improve the communication performance in the dual connectivity application scenario.

It should be understood that in the embodiments of the present disclosure, the RF unit 801 is configured to receive and send signals during an information receiving and sending process or a call process. To be specific, the RF unit 801 is configured to receive downlink data from a base station, send the downlink data to the processor 810 for processing, and send uplink data to the base station. Generally, the RF unit 801 includes, but is not limited to, an antenna, at least one amplifier, a transceiver, a coupler, a low noise amplifier, a duplexer, and the like. In addition, the RF unit 801 may further communicate with other devices through a wireless communications system/network.

The terminal provides wireless broadband Internet access for a user by using the network module 802, for example, allowing the user to receive and send emails, browse webpages, access streaming media content, and so on.

The audio output unit 803 may convert audio data received by the RF unit 801 or the network module 802 or stored in the memory 809 into an audio signal and output the audio signal as a sound. In addition, the audio output unit 803 may provide an audio output (such as a call signal receiving sound or a message receiving sound) related to a specific function executed by the terminal 800. The audio output unit 803 includes a loudspeaker, a buzzer, a receiver, and the like.

The input unit 804 is configured to receive an audio or video signal. The input unit 804 may include a graphics processing unit (GPU) 8041 and a microphone 8042. The GPU 8041 is configured to process image data of a static picture or a video that is captured by an image capturing apparatus (for example, a camera) in a video capture mode or an image capture mode. An image frame that has been processed may be displayed on the display unit 806. The image frame that has been processed by the GPU 8041 may be stored in the memory 809 (or other storage media) or sent by using the RF unit 801 or the network module 802. The microphone 8042 may receive a sound, and can process the sound into audio data. The processed audio data may be converted, in a phone call mode, into a format that can be sent to a mobile communication base station through the RF unit 801 for output.

The terminal 800 may further include at least one sensor 805, such as an optical sensor, a motion sensor, and other sensors. To be specific, the optical sensor includes an ambient light sensor and a proximity sensor. The ambient light sensor may adjust luminance of a display panel 8061 according to the luminance of ambient light, and the proximity sensor may switch off the display panel 8061 and backlight when the terminal 800 is moved to an ear. As one type of motion sensor, an acceleration sensor may detect magnitude of accelerations in various directions (generally on three axes), and detect the magnitude and direction of gravity at rest. The acceleration sensor is configured to recognize the attitude of the terminal (for example, switching between landscape orientation and portrait orientation, related gaming, and magnetometer attitude calibration), a function related to vibration recognition (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, and the like, which will not be described in detail herein.

The display unit 806 is configured to display information inputted by the user or information to be presented to the user. The display unit 806 may include a display panel 8061. The display panel 8061 may be configured in the form of a liquid crystal display (LCD), an organic light-emitting diode (OLED), or the like.

The user input unit 807 is configured to receive inputted digital or character information, and generate a key signal input related to user settings and function control of the terminal. To be specific, the user input unit 807 may include a touch panel 8071 and other input devices 8072. The touch panel 8071, also called a touch screen, is configured to collect a touch operation made by the user on or in proximity to the touch panel 8071 (e.g., an operation made by the user through any appropriate object or attachment (e.g., finger or stylus) on or in proximity to the touch panel 8071). The touch panel 8071 may include a touch detection apparatus and a touch controller. The touch detection apparatus is configured to detect a touch position of the user and a signal generated due to the touch operation, and transmit the signal to the touch controller. The touch controller is configured to receive touch information from the touch detection apparatus, convert the touch information into coordinates of a touch point, transmit the coordinates to the processor 810, and receive and execute a command sent from the processor 810. In addition, the touch panel 8071 may be of a resistive type, a capacitive type, an infrared type, or a surface acoustic wave (SAW) type. In addition to the touch panel 8071, the user input unit 807 may further include the other input devices 8072. To be specific, the other input devices 8072 include, but not limited to, a physical keyboard, a functional button (such as a volume control button or an on/off button), a trackball, a mouse, and a joystick, which will not be described in detail herein.

Further, the touch panel 8071 may cover the display panel 8071. When detecting a touch operation made on or in proximity to the touch panel 8071, the touch panel 8071 transmits the touch information to the processor 810 so as to determine a type of a touch event. Then, the processor 810 provides a corresponding visual output on the display panel 8061 in accordance with the type of the touch event. Although the touch panel 8071 and the display panel 8061 are used as two separate parts to implement input and output functions of the terminal in FIG. 8, in some embodiments, the touch panel 8071 and the display panel 8061 may be integrated to implement the input and output functions of the terminal, which is not limited herein.

The interface unit 808 is an interface configured to connect an external apparatus to the terminal 800. For example, the external apparatus may include a wired or wireless headset port, an external power source (or battery charger) port, a wired or wireless data port, a storage card port, a port configured to connect an apparatus having an identification module, an audio input/output (I/O) port, a video I/O port, an earphone port, and the like. The interface unit 808 is configured to receive an input (such as data information or electric power) from the external apparatus and transmit the received input to one or more elements in the terminal 800 or is configured to transmit data between the terminal 800 and the external apparatus.

The memory 809 is configured to store a software program and various data. The memory 809 may mainly include a program storage region and a data storage region. The program storage region may store an operating system, an application (e.g., a sound play function or an image play function) required by at least one function, and the like. The data storage region may store data (e.g., audio data or a phonebook) that is created during use of the mobile phone, and the like. In addition, the memory 809 may include a high speed RAM, and may further include a non-volatile memory, such as at least one magnetic disk storage device, a flash memory, or another volatile solid storage device.

The processor 810 is the control center of the terminal, and is connected to various parts of the terminal by various interfaces and lines. By running or executing the software program and module stored in the memory 809 and invoking data stored in the memory 809, the processor 810 performs various functions of the terminal and processes data, thereby monitoring the terminal. The processor 810 may include one or more processing units. Optionally, the processor 810 may integrate an application processor and a modem processor. The application processor mainly handles operating systems, user interfaces, applications, and the like. The modem processor mainly handles wireless communication. It may be understood that the modem processor may not be integrated into the processor 810.

The terminal 800 further includes the power source 811 (such as a battery) configured to supply power to the components. Optionally, the power source 811 may be logically connected to the processor 810 by a power management system, so as to implement functions such as charging, discharging, and power consumption management via the power management system.

In addition, the terminal 800 includes some functional modules not shown, which will not be described in detail herein.

Optionally, the embodiments of the present disclosure further provide a terminal, including a processor 810, a memory 809, and a computer program stored in the memory 809 and executable by the processor 810. The computer program, when executed by the processor 810, implements the processes of the embodiments of the foregoing method for reporting assistance information, and the same technical effects can be achieved, which will not be described in detail herein again to avoid repetition.

It should be noted that the terminal 800 in this embodiment may be the terminal in any implementation of the method embodiments in the embodiments of the present disclosure. Any implementation of the terminal in the method embodiments in the embodiments of the present disclosure may be implemented by the terminal 800 in this embodiment, and the same beneficial effects can be achieved, which will not be described in detail herein again.

Figure 9:
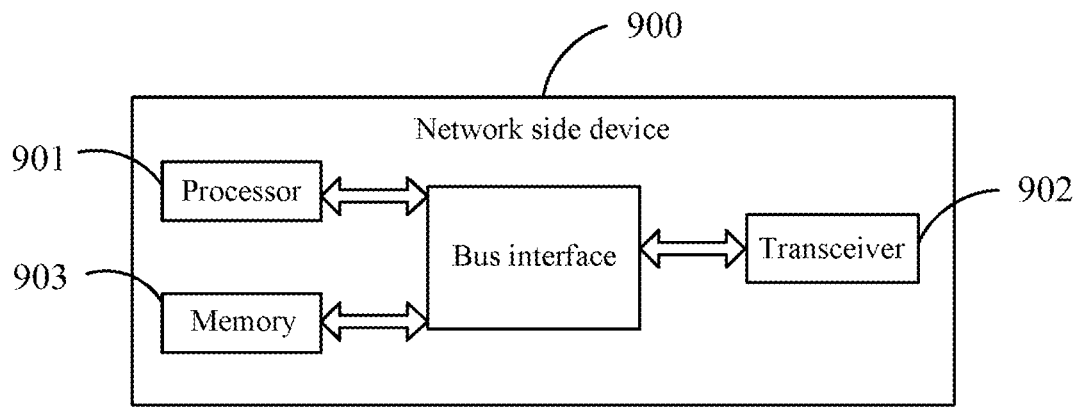
FIG. 9 is a schematic structural diagram of hardware of a network side device according to an embodiment of the present disclosure.

FIG. 9 is a structural diagram of a network side device according to an embodiment of the present disclosure. As shown in FIG. 9, the network side device 900 includes: a processor 901, a transceiver 902, a memory 903, and a bus interface.

The transceiver 902 is configured to: send control information to a terminal, where the control information is used for configuring the terminal to report assistance information to a target cell in a dual connectivity mobility process, and in the dual connectivity mobility process, the terminal maintains connections to a source cell and the target cell simultaneously; and the network side device includes at least one of a network side device of the source cell or a network side device of the target cell.

Optionally, the control information is further used for: configuring the terminal to report assistance information to the source cell in the dual connectivity mobility process; or configuring to disable reporting of assistance information to the source cell by the terminal in the dual connectivity mobility process.

Optionally, if the network side device is a network side device of the source cell, the transceiver 902 is further configured to: send a dual connectivity mobility process preparation message to a network side device of the target cell, where the dual connectivity mobility process preparation message is used for instructing to disable reporting of assistance information to the source cell by the terminal; or if the network side device is a network side device of the target cell, the transceiver 902 is further configured to: send a dual connectivity mobility process confirmation message to a network side device of the source cell, where the dual connectivity mobility process confirmation message is used for instructing to disable reporting of assistance information to the source cell by the terminal.

Optionally, the control information includes RRC message sending channel configuration information, where the RRC message sending channel configuration information is used for indicating configuration information of a first SRB used in the target cell, where the first SRB is used for reporting the assistance information of the terminal.

Optionally, the RRC message sending channel configuration information is further used for indicating configuration information used for instructing to delete a second SRB of the source cell, where the second SRB is used for reporting the assistance information of the terminal.

Optionally, the RRC message sending channel configuration information is further used for indicating configuration information of a third SRB used in the source cell, where the third SRB is used for reporting information indicating that the connection of the terminal to the target cell fails and/or the third SRB is not used for reporting the assistance information of the terminal.

Optionally, the RRC message sending channel configuration information is further used for indicating a fourth SRB used in the source cell, where before the dual connectivity mobility process, the fourth SRB is used for reporting the assistance information of the terminal, and in the dual connectivity mobility process, the fourth SRB is used for reporting information indicating that the connection of the terminal to the target cell fails and/or the fourth SRB is not used for reporting the assistance information of the terminal.

In the embodiments of the present disclosure, a network side device sends control information to a terminal, where the control information is used for configuring the terminal to report assistance information to a target cell in a dual connectivity mobility process. In this way, the terminal can report assistance information to the target cell in the dual connectivity mobility process, which ensures the advantage that the target cell obtains the assistance information in the dual connectivity mobility process, thereby avoiding a case in which reporting of assistance information to a source cell by the terminal causes the target cell to be incapable of obtaining the assistance information in the dual connectivity mobility process. This method helps to keep contents of the assistance information consistent between the network side device and the terminal, and helps to improve the communication performance in the dual connectivity application scenario.

In FIG. 9, the bus architecture may include any quantity of interconnected buses and bridges, which is specifically connected by one or more processors represented by a processor 901 and various circuits of memories represented by a memory 903. The bus architecture may further connect various other circuits such as a peripheral device, a voltage stabilizer, and a power management circuit. These are known in the art, and therefore are not further described in this specification. The bus interface provides an interface. The transceiver 902 may be a plurality of elements, that is, including a transmitter and a receiver, providing a unit configured to communicate with various other apparatuses on a transmission medium. For different terminals, the user interface 904 may alternatively be an interface capable of connecting externally and internally with a required device. The connected device includes, but not limited to, a keypad, a display, a speaker, a microphone, a joystick, and the like.

The processor 901 is responsible for the management of the bus architecture and normal processing, and the memory 903 may store data used when the processor 901 performs an operation.

It should be noted that the network side device 900 in this embodiment may be the network side device in any implementation of the method embodiments in the embodiments of the present disclosure. Any implementation of the network side device in the method embodiments in the embodiments of the present disclosure may be implemented by the network side device 900 in this embodiment, and the same beneficial effects can be achieved, which will not be described in detail herein again.

The embodiments of the present disclosure further provide a computer-readable storage medium, storing a computer program. The computer program, when executed by a processor, implements the processes of the embodiments corresponding to the terminal or the network side device, and the same technical effects can be achieved, which will not be described in detail herein again to avoid repetition. The computer-readable storage medium is, for example, a read-only memory (ROM), a random access memory (RAM), a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

According to the descriptions of the foregoing embodiments, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present disclosure or the part that makes contributions to the related art may be substantially embodied in the form of a software product. The computer software product is stored in a storage medium (for example, a ROM/RAM, a magnetic disk, or an optical disc), and contains several instructions for instructing a terminal (which may be a mobile phone, a computer, a server, an air conditioner, or a network device) to perform the method according to the embodiments of the present disclosure.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

What is claimed is:

1. A method for reporting assistance information, applicable to a terminal, the method comprising:
reporting assistance information of the terminal to a target cell in a dual connectivity mobility process, wherein
in the dual connectivity mobility process, the terminal maintains connections to a source cell and the target cell simultaneously,
wherein before the reporting assistance information of the terminal to a target cell, the method further comprises:
maintaining a fourth signaling radio bearer (SRB) of the source cell, wherein before the dual connectivity mobility process, the fourth SRB is used for reporting the assistance information of the terminal, and in the dual connectivity mobility process, the fourth SRB is not used for reporting the assistance information of the terminal, and
establishing a fifth SRB of the target cell, wherein the fifth SRB is used for reporting the assistance information of the terminal.

2. The method according to claim 1, wherein in the dual connectivity mobility process, the method further comprises:
prohibiting reporting assistance information of the terminal to the source cell; or
reporting assistance information of the terminal to the source cell.

3. The method according to claim 2, wherein if a protocol agrees that the terminal is prohibited from reporting assistance information to the source cell in the dual connectivity mobility process, the terminal reports the assistance information of the terminal to the target cell, and is prohibited from reporting the assistance information of the terminal to the source cell; or
if a network side device instructs the terminal to disable reporting of assistance information in the source cell, and to report assistance information in the target cell, the terminal reports the assistance information of the terminal to the target cell, and is prohibited from reporting the assistance information of the terminal to the source cell.

4. The method according to claim 3, further comprising:
reporting the assistance information of the terminal to the source cell if the connection of the terminal to the target cell fails and the terminal maintains the connection to the source cell.

5. The method according to claim 3, wherein the network side device comprises at least one of a network side device of the source cell or a network side device of the target cell.

6. The method according to claim 2, wherein if a network side device instructs the terminal to report assistance information in the source cell and the target cell, the terminal reports the assistance information of the terminal to the target cell and the source cell.

7. The method according to claim 6, wherein that the terminal reports the assistance information of the terminal to the target cell and the source cell comprises:
- duplicating the assistance information of the terminal to generate first assistance information and second assistance information, sending the first assistance information to the source cell, and sending the second assistance information to the target cell; or
- generating third assistance information according to configuration information of the source cell, sending the third assistance information to the source cell, generating fourth assistance information according to configuration information of the target cell, and sending the fourth assistance information to the target cell.

8. The method according to claim 1, wherein
the fourth SRB is further used for reporting information indicating that the connection of the terminal to the target cell fails.

9. A terminal, comprising a memory, a processor, and a computer program stored in the memory and executable on the processor, the computer program, when executed by the processor, implementing steps of the method for reporting assistance information, the method comprises:
- reporting assistance information of the terminal to a target cell in a dual connectivity mobility process, wherein
- in the dual connectivity mobility process, the terminal maintains connections to a source cell and the target cell simultaneously,
- wherein before the reporting assistance information of the terminal to a target cell, the method further comprises:
- maintaining a fourth signaling radio bearer (SRB) of the source cell, wherein before the dual connectivity mobility process, the fourth SRB is used for reporting the assistance information of the terminal, and in the dual connectivity mobility process, the fourth SRB is not used for reporting the assistance information of the terminal, and
- establishing a fifth SRB of the target cell, wherein the fifth SRB is used for reporting the assistance information of the terminal.

10. The terminal according to claim 9, wherein in the dual connectivity mobility process, the method further comprises:
- prohibiting reporting assistance information of the terminal to the source cell; or
- reporting assistance information of the terminal to the source cell.

11. The terminal according to claim 10, wherein if a protocol agrees that the terminal is prohibited from reporting assistance information to the source cell in the dual connectivity mobility process, the terminal reports the assistance information of the terminal to the target cell, and is prohibited from reporting the assistance information of the terminal to the source cell; or
- if a network side device instructs the terminal to disable reporting of assistance information in the source cell, and to report assistance information in the target cell, the terminal reports the assistance information of the terminal to the target cell, and is prohibited from reporting the assistance information of the terminal to the source cell.

12. The terminal according to claim 11, wherein the computer program, when executed by the processor, further implements:
- reporting the assistance information of the terminal to the source cell if the connection of the terminal to the target cell fails and the terminal maintains the connection to the source cell.

13. The terminal according to claim 10, wherein if a network side device instructs the terminal to report assistance information in the source cell and the target cell, the terminal reports the assistance information of the terminal to the target cell and the source cell.

14. The terminal according to claim 13, wherein that the terminal reports the assistance information of the terminal to the target cell and the source cell comprises:
- duplicating the assistance information of the terminal to generate first assistance information and second assistance information, sending the first assistance information to the source cell, and sending the second assistance information to the target cell; or
- generating third assistance information according to configuration information of the source cell, sending the third assistance information to the source cell, generating fourth assistance information according to configuration information of the target cell, and sending the fourth assistance information to the target cell.

15. The terminal according to claim 9, wherein
the fourth SRB is further used for reporting information indicating that the connection of the terminal to the target cell fails.

16. A network side device, comprising a memory, a processor, and a computer program stored in the memory and executable on the processor, the computer program, when executed by the processor, implementing steps of the method for configuring reporting of assistance information, wherein the method comprises:
- sending control information to a terminal, wherein the control information is used for configuring the terminal to report assistance information to a target cell in a dual connectivity mobility process, and
- in the dual connectivity mobility process, the terminal maintains connections to a source cell and the target cell simultaneously,
- wherein the control information comprises radio resource control (RRC) message sending channel configuration information, wherein
- the RRC message sending channel configuration information is used for indicating configuration information of a first signaling radio bearer (SRB) used in the target cell, wherein the first SRB is used for reporting the assistance information of the terminal,
- wherein the RRC message sending channel configuration information is further used for indicating a fourth SRB used in the source cell, wherein before the dual connectivity mobility process, the fourth SRB is used for reporting the assistance information of the terminal, and in the dual connectivity mobility process, the fourth SRB is not used for reporting the assistance information of the terminal.

17. The network side device according to claim 16, wherein the control information is further used for:
- configuring the terminal to report assistance information to the source cell in the dual connectivity mobility process; or
- configuring to disable reporting of assistance information to the source cell by the terminal in the dual connectivity mobility process.

18. The network side device according to claim 17, wherein before the sending control information to a terminal, the method further comprises:

sending, if the network side device is a network side device of the source cell, a dual connectivity mobility process preparation message to a network side device of the target cell, wherein the dual connectivity mobility process preparation message is used for instructing to disable reporting of assistance information to the source cell by the terminal; or sending, if the network side device is a network side device of the target cell, a dual connectivity mobility process confirmation message to a network side device of the source cell, wherein the dual connectivity mobility process confirmation message is used for instructing to disable reporting of assistance information to the source cell by the terminal.

19. The network side device according to claim 16, in the dual connectivity mobility process, the fourth SRB is further used for reporting information indicating that the connection of the terminal to the target cell fails.

\* \* \* \* \*